United States Patent [19]

Krueger

[11] 4,037,927
[45] July 26, 1977

[54] LIQUID CRYSTAL DISPLAY SCREEN WITH MULTIPLE ELECTRODE ARRANGEMENT

[75] Inventor: Hans Krueger, Munich, Germany

[73] Assignee: Siemens Aktiengesellschaft, Berlin & Munich, Germany

[21] Appl. No.: 542,804

[22] Filed: Jan. 21, 1975

[30] Foreign Application Priority Data

Jan. 21, 1974 Germany .............................. 2402749

[51] Int. Cl.² ............................ G02F 1/16; G09F 9/32
[52] U.S. Cl. ............................... 350/160 LC; 340/336
[58] Field of Search ................... 350/160 LC; 340/336

[56] References Cited

U.S. PATENT DOCUMENTS

| 3,622,224 | 11/1971 | Wysocki et al. | 350/160 LC |
| 3,848,247 | 11/1974 | Sherr | 350/160 LC X |
| 3,899,786 | 8/1975 | Greubel | 350/160 LC X |

Primary Examiner—John K. Corbin
Assistant Examiner—Rolf Hille
Attorney, Agent, or Firm—Hill, Gross, Simpson, Van Santen, Steadman, Chiara & Simpson

[57] ABSTRACT

A liquid crystal display screen having a liquid crystal layer disposed between a pair of carrier plates to form a liquid crystal cell characterized in a plurality of electrode layers disposed between the carrier plates with adjacent electrode layers being separated by an insulating layer and selected electrode layers being in the shape of characters or digits and being energized to form displays of different characters or digits. In one embodiment, a digit electrode layer is applied on opposite faces of the liquid crystal layer and a continuous electrode is separated by an insulating layer from each of the additional electrode layers. In a second embodiment, the liquid crystal layer is disposed between a continuous electrode layer and more than two digit electrode layers with the outermost digit electrode layer being continuous whereas the inner digit electrodes have interrupted conducting surfaces. In the third embodiment, a color filter such as a three-color triplet having the colors arranged in strips is disposed between the carrier plates, the continuous electrode is formed by three electrode layers separated by insulating layers with each layer having strips of electrodes overlying the strips of a specific color so by selecting the energizing of various electrodes, a character of one color can be produced.

6 Claims, 3 Drawing Figures

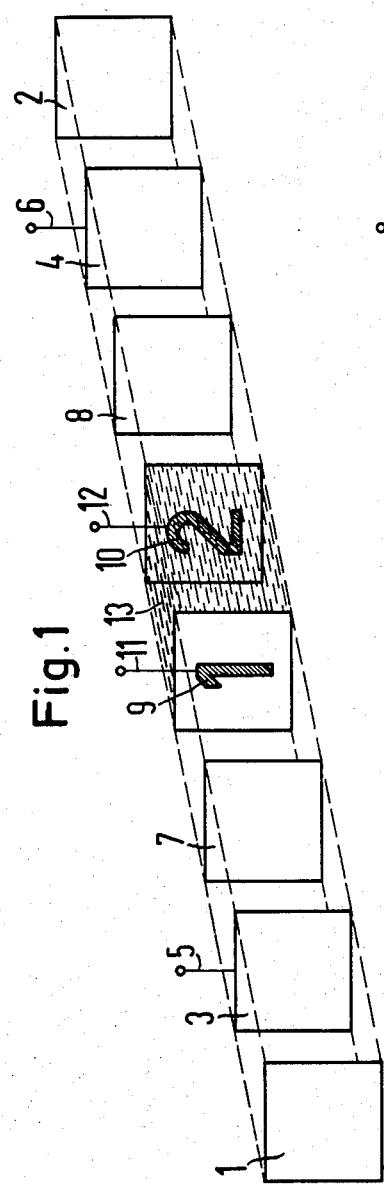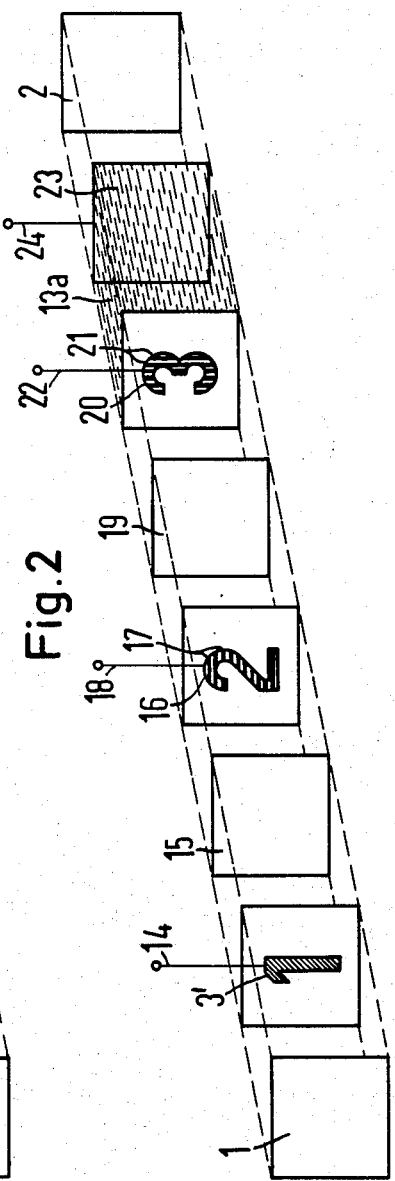

LIQUID CRYSTAL DISPLAY SCREEN WITH MULTIPLE ELECTRODE ARRANGEMENT

BACKGROUND OF THE INVENTION

The present invention relates to a liquid crystal display screen composed of two transparent carrier plates with a liquid crystal layer therebetween to form a liquid crystal cell which may be operated for separate displays in terms of time of at least two characters such as digits.

Liquid crystal display screens which are capable of displaying different digits are known. For example, in German Offenlegungschrift No. 2 122 680, a seven-segment electrode is utilized and by energizing various segments, the digits 0 to 9 may be successively represented.

In this display system there is, however, a danger that undesirable digits will be represented when one or more of the segments do not operate on account of technical faults or difficulties.

SUMMARY OF THE INVENTION

The present invention is directed to a device to provide a liquid crystal display screen in which all of the digits can be operated independently of one another. This task is accomplished in the present invention by providing between the carrier plates of the cell a layer sequence of transparent, continuous, electrically conductive layers, insulating layers, and electrically conducting digit layers bounded by the digit shape. In one embodiment of the invention, two digit panels, each having a layer of continuous, transparent conductive material in the shape of the digit and two electrode panels each having a layer of transparent, continuous electrically conductive material, with the material of each panel being connected to a separate electrical lead are arranged in the cell with the liquid crystal layer disposed between the two digit panels and one of the electrode panels disposed between each digit panel and the adjacent carrier plate and separated from its respective digit panel by an insulating layer. In a second embodiment of the invention, one digit is provided either on or adjoining one of the carrier plates by a transparent, continuous electrically conductive material. The remaining digits of the cell are on digit panels which are disposed between the carrier plate and the liquid crystal layer with each panel being separated from adjacent panels by insulating layers and with an electrode panel provided as a continuous electrically conducting layer either on or adjoining the second carrier plate and a liquid crystal layer between the electrode panel and the digit panels. The conducting material defining the digits on each of the digit panels is in the form of electrically connected spaced parallel strips with the direction of the strips of each of the panels extending in different directions. A third embodiment includes a digit formed on one carrier plate and the digit panels of the second embodiment with a colored strip layer with a plurality of successively red-green-blue color triplets disposed between the other carrier plate and the liquid crystal layer. Three comb-like electrode strip layers which are separated from one another by insulating layers are disposed between the colored strip layer and the liquid crystal layer with the electrodes of each comb-like electrode strip layer coinciding with all of the color strips of one color so that a color display of each of the digits can be obtained. In each of the embodiments, a pair of cross polarizers may be provided with the liquid crystal disposed therebetween.

BRIEF DESCRIPTION OF THE DRAWINGS

FIG. 1 is an exploded schematic view of one embodiment of the liquid crystal display screen in accordance with the present invention;

FIG. 2 is an exploded schematic view of a second embodiment of the liquid crystal display screen of the present invention.

DESCRIPTION OF THE PREFERRED EMBODIMENTS

Figure 3:
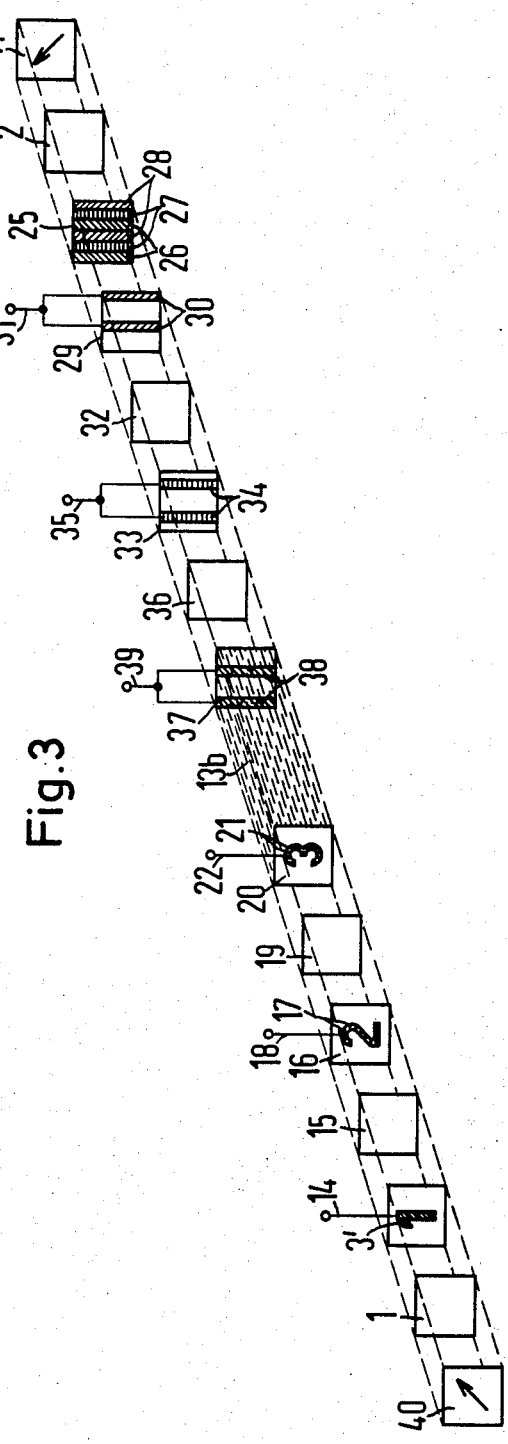
FIG. 3 is an exploded schematic view of a third embodiment of a liquid crystal display screen according to the present invention.

The principles of the present invention are particularly useful when incorporated into a liquid crystal display screen such as illustrated in FIG. 1, which includes two glass carrier plates 1 and 2. The two carrier plates are adjoined by a continuous, transparent electrically conductive layers 3 and 4 which may consist of $SnO_2$, $In_2O_3$, $SnO_2 \cdot In_2O_3$, Al, Ni, or Ta. The conductive layers 3 and 4 are provided with terminals 5 and 6, respectively, to enable a specific potential thereto and the layers 3 and 4 form electrode panels. The electrical conductive layers or electrode panels 3 and 4 are adjoined by insulating layers 7 and 8 which may consist of $SiO_2$, $Al_2O_3$, $SiO_2 \cdot Al_2O_3$, $Si_2O_2B_2O_3$ or $Ta_2O_5$. Digit panels 9 and 10 are provided or arranged on or adjoining these insulating layers 7 and 8, respectively, and are provided with characters such as the digits 1 and 2 which are formed by a layer of electrical conducting material such as the material utilized to form the continuous layer on the electrode panels 3 and 4, respectively. The material of the panels 9 and 10 are electrically connected to electrical leads 11 and 12, respectively, to allow individual application of potential to these layers. Each of the panels or insulating layers may have a thickness of between 0.1 $\mu$m and 1 $\mu$m.

Disposed between the digit panels 9 and 10 is a liquid crystal layer 13. The liquid crystal layer may be a cholesteric liquid crystal mixture having storage properties with a thickness of approximately 10 $\mu$m. This layer has a transparent and/or light diffusing texture. Each of the transparent and diffusing textures are transformed into one another by electrical fields.

To display a digit 1, the electrode or the leads 12 and 6 are connected to ground so that the digit 2 and the continuous electrode 4 are grounded and a voltage is applied to leads 11 to energize the layer of the digit panel 9 which causes one texture of the liquid crystal layer 13 to be transformed to another. If in addition, the lead 5 is connected with the same voltage as that connected to the other lead 11 the entire display surface will be excited.

When the leads 5 and 11 are grounded and a voltage is connected to the lead 12, the digit 2 is displayed.

If the electrode 5 is connected to ground and the electrodes 11, 12 and 6 are connected to a voltage source or if the lead 6 is connected to ground and the electrodes 11, 12 and 5 are connected to the voltage source, the entire display area with the exception of either the digit 1, as in the first case, or 2, is visible.

Erasure of the storage display is effected by connecting a voltage to the leads 5 and 6.

The voltage required for these displays are in the order of a few volts. The displays are in each case effected when the display screen is illuminated either in transmission or if a reflective layer is applied to one of the carrier plates by reflection.

While the above described embodiment enables illuminating two separate digits such as the digits 1 and 2, three or more digits may be provided in the embodiment illustrated in FIG. 2. Electrically conductive digit layer 3' is arranged in the form of a digit 1 and is either applied on the carrier plate 1 or adjoining thereto and is provided with electrical lead 14. This is followed by an insulating layer 15 and the latter by electrically conducting digit panel with a layer 16. The layer 16 is not formed by a continuously electric conducting material but is designed in the form of horizontal conducting paths or strips 17 which are a few micrometers thick and are electrically connected to one another. The horizontal conducting paths 17 are delimited by the shape of the digit 2, which is to be represented, and a specific potential can be applied via a lead 18. The panel formed by the conducting paths 17 is followed by an insulating layer 19 and then by a digit panel having a layer 20 which consists of perpendicular electrically conducting paths or strips 21 which can be operated via the electrical lead 22. Adjacent the opposite surface of the panel or layer 20 is a liquid crystal layer 13a with a continuous electrically conductive layer 23 having a lead 24 to form an electrode panel on the opposite surface thereof. This continuous layer 23 preferably is adjoined by the carrier plate 2.

To present the digit one, the continuous electrode panel 23 is grounded by connecting the lead 24 to ground and the lead 14 is connected to a potential. The electrical field between the layer 3' and electrode panel 23 passes through the interrupted electrode layers 16 and 20 which may mask portions of the field and the numeral 1 will be formed by a raster of energized dots having the shape of the digit one in the liquid crystal layer 13a. In a similar manner, to produce the numeral two which is in the panel 16, the lead 18 is connected to a potential and the field generated by the parallel strips 17 will create a raster of dots in the liquid crystal layer 13a due to partial masking by the electrode strips 21. Finally, to present the numeral three, the lead 22 is connected to a potential and the numeral three will appear as energized strips in the liquid crystal layer 13a.

In the embodiment schematically illustrated in FIG. 3, it is possible to represent the numerals or digits one, two and three in arbitrary colors. For this purpose, the arrangement, which has been represented, contains a Schadt-Helfrich cell. The liquid crystals have a positive dielectric anisotropy between cross polarizers 40 and 41. The homogeneous orientation between the layer 37 and the digit layer 20 causes rotation of the polarized light by 90°. When a linearly polarized light passes through the field-free crystal layer, such as 13b, the polarization of the light is rotated 90° and the entire cell or layer transmits light. When a full operating voltage, which creates a field on the layer 13b, is applied to the layer 13b, an isotropic texture is created and the entire arrangement becomes impermeable to light.

In the embodiment of FIG. 3, the arrangement of the carrier plate 1, the digit panels and insulating panels up to the panel 20 are the same as in the embodiment of FIG. 2. The other carrier plate 2 is adjoined by a colored strip system 25 which consists of a plurality of consecutive red-green-blue color strip triplets. For clarity of illustration, only two colored strip triplets each having colors red (26), green (27) and blue (28), have been illustrated. Between the colored strip system 25 and the liquid crystal layer 13b in order are an electrode layer 29 which is a comb-like design and whose strip shape electrodes 30 lie above the color strips 28 and are connected to an electrical lead 31 for operation. Adjacent the electrode layer 29 is an insulating 32 and this in turn separates layer 29 from a second comb-like electrode layer 33 whose electrode strips 34 lie exactly over the green colored strips 27. The electrode strips 34 are interconnected to electrical leads 35 for operation or to be energized. Another insulating 36 separates the electrode 33 from an electrode layer 37 which has electrode strips 38 which coincide with the red color strips 26 and which strips 38 are connected to an electrical lead 39. The electrode layer 37 is adjacent to a liquid crystal layer 13b.

To produce, for example, a red display of the digit or numeral two, the leads 18 and 39 are connected to ground and the leads 31 and 35 are connected to a voltage source. In this case, the polarization direction of the linearly polarized light is rotated by 90° only in the regions of the liquid crystal layer 13b which are behind the electrode strips 38 and only a red light component will pass through the second polarizer 41 in the region defined by the numeral two. The green and blue light components are extinguished by the second polarizer 41 since the energizing of the electrode strips 30 and 34 destroys the rotational characteristics of the liquid crystal layer 13b in those areas and renders the crystal impermeable to light in those particular areas.

As in the Schadt-Helfrich cell, the permeability of the light can be controlled and is dependent on the applied operating voltage. It is possible to produce mixed colors similar to the process in color television receivers by applying different operating voltages to electrical leads 31, 35 and 39 to place the electrodes 30, 34 and 38, respectively, at different potentials.

These display screens can, for example, be used for display purposes in scales or in railroad signals.

Although minor modifications may be suggested by those versed in the art, it should be understood that I wish to employ within the scope of the patent granted hereon, all such modifications as reasonably and properly come within the scope of my contribution to the art.

I claim:

1. In a liquid crystal display screen which may be operated to separately display in time sequence at least two digits, said screen comprising a liquid crystal cell having two transparent carrier plates with a liquid crystal layer disposed therebetween, the improvement comprising a continuous, transparent electrical conductive layer disposed adjacent one of the two carrier plates and having a shape of a first digit and being provided with an electrical lead; at least one additional digit panel positioned between the layer forming the first digit and the liquid crystal layer, each of said additional digit panels having an interrupted electrical conducting layer in the form of a plurality of parallel strips delimiting an additional digit with said strips being interconnected to a single electrical lead and the strips of each additional digit panel extending in different directions, an insulating layer disposed between adjacent conductive layers, and electrical conducting electrode layer adjoining the other of said two carrier plates with the liquid crystal layer between the electrode layer and the digit panels so that a selected application of a potential on the electrode layer and a conductive layer of the digit creates an indication of the selected digit in the liquid crystal layer.

2. In a liquid crystal display screen according to claim 1, which includes a pair of cross polarizers with the liquid crystal cell disposed therebetween.

3. In the liquid crystal display screen according to claim 1, wherein the cell includes a color strip layer with a plurality of successively red, green, blue color triplets disposed between the other carrier plate and the liquid crystal layer, and wherein the electrode layer is formed of three comb-like electrode strip layers, which are separated from one another by insulating layers and disposed between the color strip layer and the liquid crystal layer with electrodes of each comb-like strip layer coinciding with all of the color strips of a separate one of the three colors of the color strip layer so that a colored display of each of the digits can be obtained.

4. In a liquid crystal display screen according to claim 3, which includes a pair of cross polarizers with the liquid crystal cell disposed therebetween.

5. In a liquid crystal display screen which may be operated to separately display in time sequence at least two digits, said screen comprising a liquid crystal cell having two transparent carrier plates with a liquid crystal layer disposed therebetween, the improvement comprising a continuous, transparent electrical conductive layer disposed adjacent one of the two carrier plates and having the shape of a first digit, said layer being provided with an electrical lead, at least one additional digit panel having an electrical conducting layer having an electrical lead and delimiting a second digit, each of said additional digit panels being positioned between the layer forming the first digit and the liquid crystal layer with an insulating layer disposed between adjacent conductive layers, a color strip layer with a plurality of successive red-green-blue color strip triplets disposed in the cell adjacent the other of the two carrier plates, three comb-like electrode strip layers disposed between the color strip layer and the liquid crystal layer with an insulating layer disposed between adjacent electrode strip layers, said electrode strip layer being arranged so that the comb-like electrodes of each electrode strip layer coincides with all of the colored strips of a separate one of the three colors of the color strip layer so that by selectively energizing selected electrode strip layers and a selected digit layer a colored presentation of the digit will occur.

6. In a liquid crystal display screen according to claim 5, which includes a pair of cross polarizers with the liquid crystal cell disposed therebetween.

* * * * *